(12) United States Patent
Shin et al.

(10) Patent No.: US 8,497,968 B2
(45) Date of Patent: Jul. 30, 2013

(54) LIQUID CRYSTAL DISPLAY HAVING CAPACITANCE-COUPLED FLOATING ELECTRODE

(75) Inventors: Kyoung-Ju Shin, Hwaseong-si (KR); Chong-Chul Chai, Seoul (KR); Hwa-Sung Woo, Suwon-si (KR); Kwang-Chul Jung, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 712 days.

(21) Appl. No.: 12/492,194

(22) Filed: Jun. 26, 2009

(65) Prior Publication Data
US 2010/0002161 A1    Jan. 7, 2010

(30) Foreign Application Priority Data
Jul. 3, 2008   (KR) ........................ 10-2008-0064404

(51) Int. Cl.
*G02F 1/1343* (2006.01)

(52) U.S. Cl.
USPC ................ 349/144; 349/38; 349/48; 349/141

(58) Field of Classification Search
USPC ...................... 349/38, 48, 141, 144
See application file for complete search history.

(56) References Cited

U.S. PATENT DOCUMENTS

| | | | | |
|---|---|---|---|---|
| 5,333,004 A * | 7/1994 | Mourey et al. | ................. | 345/92 |
| 6,690,434 B1 * | 2/2004 | Yamazaki et al. | ............... | 349/42 |
| 2004/0061809 A1 * | 4/2004 | Lee | ................................ | 349/43 |
| 2006/0125970 A1 * | 6/2006 | Inoue et al. | ..................... | 349/38 |
| 2006/0232537 A1 * | 10/2006 | Kim et al. | ....................... | 345/92 |

\* cited by examiner

*Primary Examiner* — Michael Caley
(74) *Attorney, Agent, or Firm* — Cantor Colburn LLP

(57) ABSTRACT

A liquid crystal display (LCD) includes a first sub-pixel electrode to which a first data signal is applied, a second sub-pixel electrode which is spaced apart from the first pixel electrode and to which a second data signal is applied, and a floating electrode which is capacitance-coupled to the first sub-pixel electrode and the second sub-pixel electrodes. Also described is a method of controlling an LCD, the method including applying a first data signal to a first sub-pixel electrode, applying a second data signal to a second sub-pixel electrode, and capacitance-coupling a floating electrode to the first sub-pixel electrode and the second sub-pixel electrode.

16 Claims, 13 Drawing Sheets

LIQUID CRYSTAL DISPLAY HAVING CAPACITANCE-COUPLED FLOATING ELECTRODE

This application claims priority to Korean Patent Application No. 10-2008-0064404, filed on Jul. 3, 2008, and all the benefits accruing therefrom under 35 U.S.C. §119, the contents of which in its entirety are herein incorporated by reference.

BACKGROUND OF THE INVENTION

1. Field of the Invention

This disclosure relates to a liquid crystal display ("LCD"), which can contribute to improvement of picture quality and visibility.

2. Description of the Related Art

In recent years, the demand for flat panel displays, such as a plasma display panel ("PDP"), a plasma-addressed liquid crystal ("PALC") display, an LCD, or an organic light-emitting diode ("OLED") display, has exponentially increased because commercially available cathode ray tube ("CRT") devices do not meet the demand for thin, large-scale display devices. Since flat panel display devices can provide high picture quality, are lightweight, and thin, flat panel display devices have been widely used in various electronic devices.

LCDs are one of the most widely used flat panel displays. LCD displays include two display panels with field-generating electrodes, such as a pixel electrode and a common electrode mounted thereon, and a liquid crystal layer interposed between the two display panels. LCDs display images by applying a voltage to the electrodes so as to realign liquid crystal molecules in a liquid crystal layer, thereby controlling the amount of light transmitted through the liquid crystal layer.

In order to improve contrast ratio and viewing angle, which affects the display quality of LCDs, patterned vertically aligned ("PVA") or in-plane switching ("IPS") LCDs have been developed. Also, various methods of controlling an LCD, for example where each pixel is divided into a plurality of domains and is controlled in units of the domains, have been suggested. Thus, it would be desirable to have an improved method to effectively apply a voltage to a plurality of domains of each pixel in a display, and thus improve the display quality and the viewing angle of an LCD.

BRIEF SUMMARY OF THE INVENTION

Aspects of the disclosed embodiments provide a LCD, which can contribute to improvement of picture quality and visibility.

However, the aspects, features, and advantages of the disclosed embodiments are not restricted to those set forth herein. The above and other aspects, features and advantages of the disclosed embodiments will become more apparent to one of ordinary skill in the art with reference to the following detailed description and appended claims.

The above described and other drawbacks are alleviated by an LCD including: a first sub-pixel electrode to which a first data signal is applied; a second sub-pixel electrode which is spaced apart from the first pixel electrode and to which a second data signal is applied; and a floating electrode which is capacitance-coupled to the first sub-pixel electrode and the second sub-pixel electrode.

Also described herein is a method of controlling an LCD, the method including applying a first data signal to a first sub-pixel electrode, applying a second data signal to a second sub-pixel electrode, and capacitance-coupling a floating electrode to the first sub-pixel electrode and the second sub-pixel electrode.

BRIEF DESCRIPTION OF THE DRAWINGS

The disclosed subject matter is particularly pointed out and distinctly claimed in the claims at the conclusion of the specification. The above and other aspects and features of the disclosed embodiments will become more apparent by describing in detail exemplary embodiments thereof with reference to the attached drawings, in which:

The detailed description explains the embodiments, together with advantages and features, by way of example with reference to the drawings.

DETAILED DESCRIPTION OF THE INVENTION

The disclosed embodiments will now be described more fully with reference to the accompanying drawings, in which exemplary embodiments are shown. The embodiments may, however, be embodied in many different forms and should not be construed as being limited to the embodiments set forth herein. Rather, these embodiments are provided so that this disclosure will be thorough and complete, and will fully convey the disclosed concepts to those skilled in the art.

Furthermore, relative terms such as "below," "beneath," or "lower," "above," or "upper" may be used herein to describe one element's relationship to another element as illustrated in the accompanying drawings. It will be understood that relative terms are intended to encompass different orientations of the device in addition to the orientation depicted in the accompanying drawings. For example, if the device in the accompanying drawings is turned over, elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the exemplary terms "below" and "beneath" can, therefore, encompass both an orientation of above and below.

The terms "the", "a", and "an" do not denote a limitation of quantity, but rather denote the presence of at least one of the referenced item.

Figure 1:
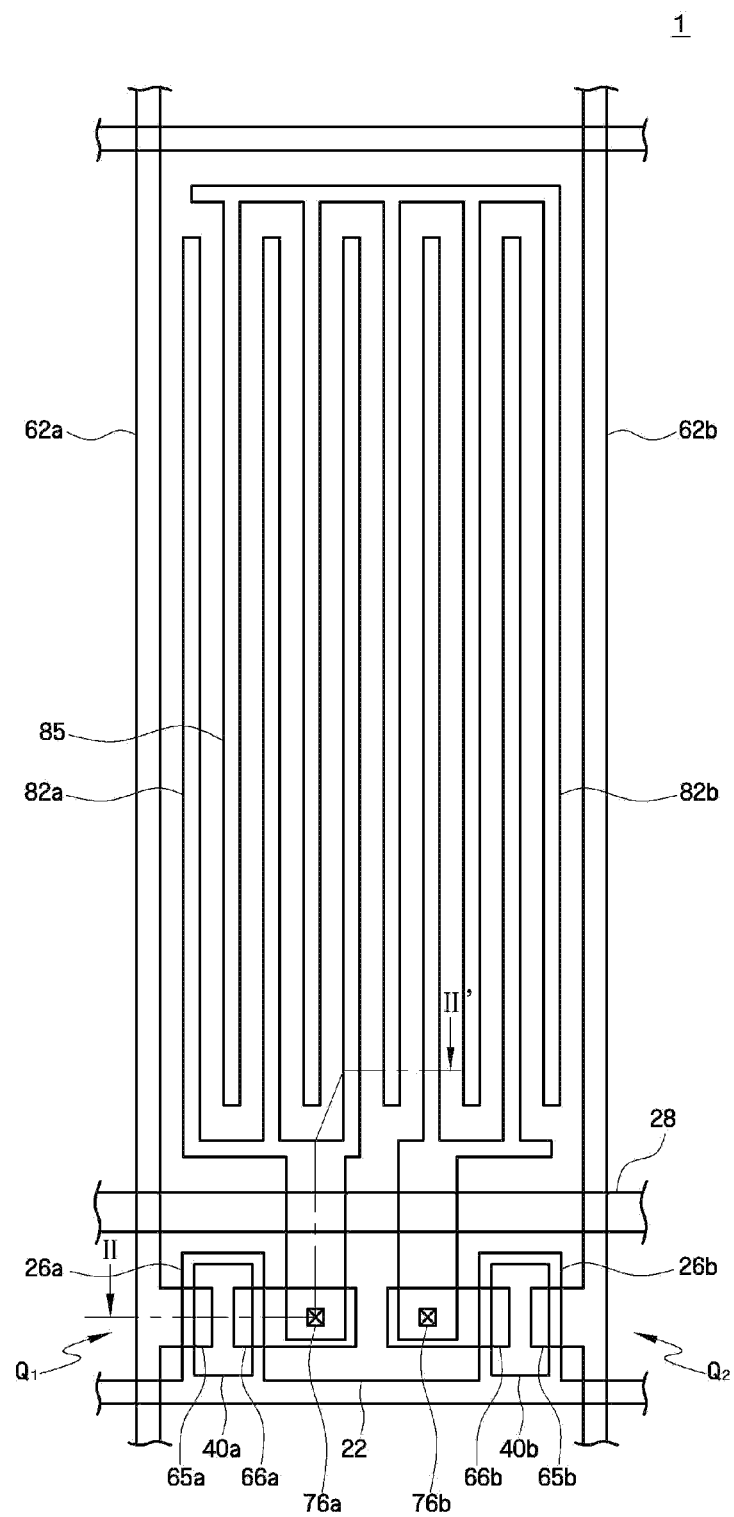
FIG. 1 is a plan view showing an exemplary embodiment of an LCD.
Figure 2:
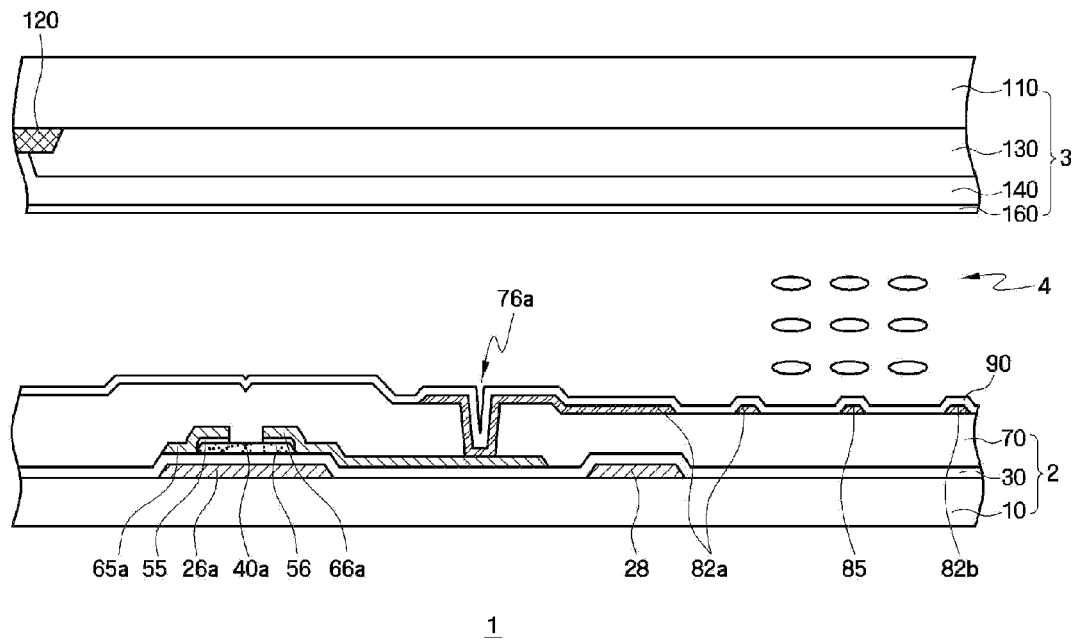
FIG. 2 is a cross-sectional view taken along line II-II' of FIG. 1 showing an exemplary embodiment of an LCD.
Figure 3:
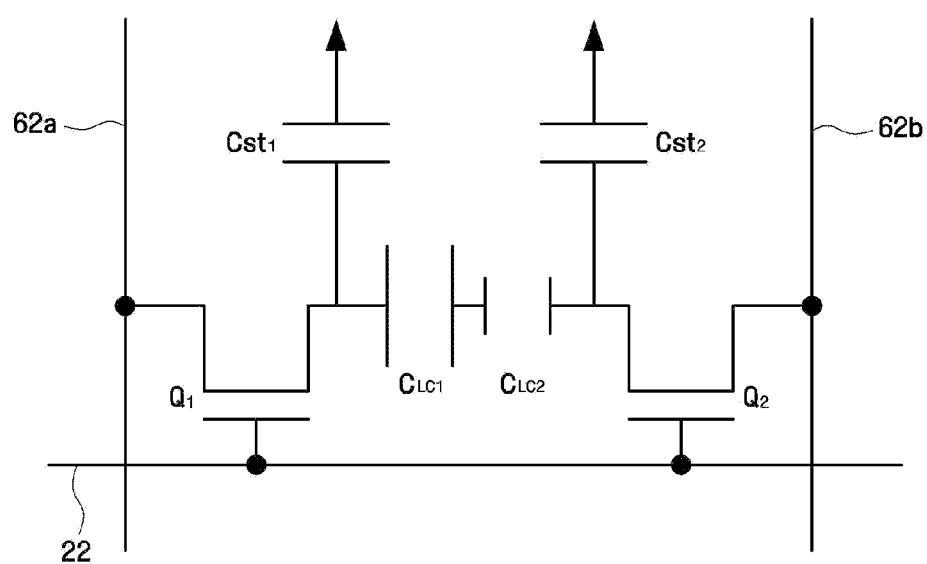
FIG. 3 is an equivalent circuit diagram of an exemplary embodiment of a pixel of the LCD shown in FIG. 1.
Figure 4:
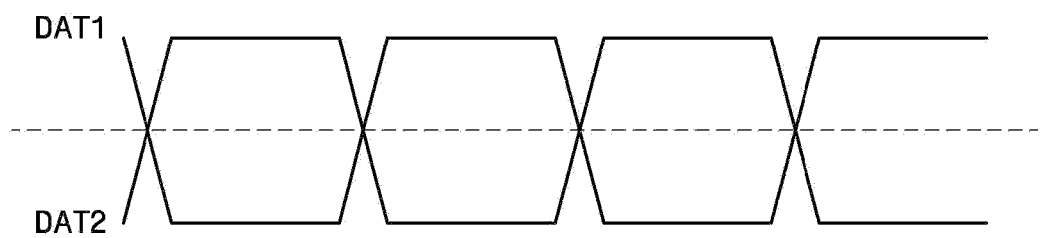
FIG. 4 is a waveform diagram showing an exemplary embodiment of a first data signal and a second data signal which are applied to the LCD shown in FIG. 1.

A liquid crystal display ("LCD") according to an exemplary embodiment will hereinafter be described in detail with reference to FIGS. 1 through 4. FIG. 1 is a plan view showing another exemplary embodiment of an LCD 1, FIG. 2 is a cross-sectional view taken along line II-II' of FIG. 1, FIG. 3 is an equivalent circuit diagram of an exemplary embodiment of a pixel of the LCD 1, and FIG. 4 is a waveform diagram showing an exemplary embodiment of a first and a second data signals, which are applied to the LCD.

The LCD 1 includes a lower display panel 2 on which a thin-film transistor ("TFT") array (not shown) is disposed, an upper display panel 3, which faces the lower display panel 2, and a liquid crystal layer 4, which is interposed between the lower display panel 2 and the upper display panel 3.

A gate line 22 is disposed on a first insulating substrate 10, which comprises a transparent material such as glass. The gate line 22 extends in a first direction, for example a horizontal direction, and transmits a gate signal. The gate line 22 is allocated to one pixel. A first and a second gate electrodes 26a and 26b extend from the gate line 22. The gate line 22 and the first and the second gate electrodes 26a and 26b are collectively referred to as gate wiring.

A storage line 28 extends across a pixel region. The storage line 28 extends in a direction substantially parallel to the gate line 22. The storage line 28 forms a storage capacitor, which improves the charge storage capability of a pixel, by overlapping a first and a second sub-pixel electrodes 82a and 82b. In the exemplary embodiment shown in FIGS. 1 through 3, the storage line 28 extends parallel to the gate line 22 and partially overlaps the first and the second sub-pixel electrodes 82a and 82b. However, the disclosed embodiments are not restricted to this configuration. That is, the shape and the arrangement of the storage line 28 may have other configurations. The storage line 28 may be optional if the first and the second sub-pixel electrodes 82a and 82b generate a sufficient storage capacitance by overlapping the gate line 22.

The gate wiring (22, 26a, and 26b) and the storage line 28 may comprise an aluminum (Al)-based metal (such as aluminum or an aluminum alloy), a silver (Ag)-based metal (such as silver or a silver alloy), a copper (Cu)-based metal (such as copper or a copper alloy), a molybdenum (Mo)-based metal (such as molybdenum or a molybdenum alloy), chromium (Cr), titanium (Ti), tantalum, or the like, or a combination comprising at least one of the foregoing metals. Each of the gate wiring (22, 26a, and 26b) and the storage line 28 may comprise a multilayer structure including at least two conductive layers, each having different physical properties. In this case, one of the two conductive layers of each of the gate wiring (22, 26a, and 26b) and the storage line 28 may comprise an electrically conductive metal, such as an aluminum-based metal, a silver-based metal or a copper-based metal, or the like, or a combination comprising at least one of the foregoing metals, to reduce a signal delay or a voltage drop in the gate wiring (22, 26a, and 26b) and the storage line 28. Another conductive layer of each of the gate wiring (22, 26a, and 26b) and the storage line 28 may comprise a metal such as a molybdenum-based metal, chromium, titanium, tantalum, or the like, or a combination comprising at least one of the foregoing metals, which has excellent bonding properties with respect to transparent material, such as indium tin oxide ("ITO"), indium zinc oxide ("IZO"), or the like, or a combination comprising at least one of the foregoing transparent materials. For example, each of the gate wiring (22, 26a, and 26b) and the storage line 28 may include a lower layer comprising chromium, and an upper layer comprising aluminum, or may include a lower layer comprising aluminum and an upper layer comprising molybdenum. However, the disclosed embodiments are not restricted to this configuration. That is, the gate wiring (22, 26a, and 26b), and the storage line 28, may comprise various metals or conductive materials other than those set forth herein.

A gate insulating layer 30 comprises silicon nitride (SiNx), or the like, and can be disposed on the gate line 22 and the storage line 28.

A first and a second semiconductor layers 40a and 40b are disposed on the gate insulation layer and may comprise hydrogenated amorphous silicon, polycrystalline silicon, or the like, or a combination comprising at least one of the foregoing semiconductors. The first and the second semiconductor layers 40a and 40b may be disposed as islands or lines. In the embodiment shown in FIGS. 1 through 3, the first and the second semiconductor layers 40a and 40b are disposed as islands.

Two pairs of a first and a second ohmic contact layers 55 and 56 are respectively disposed on the first and the second semiconductor layers 40a and 40b and may comprise silicide, n+ hydrogenated amorphous silicon doped with a high concentration of n-type impurities, or the like, or a combination comprising at least one of the foregoing semiconductors.

A first and a second data lines 62a and 62b, and a first and a second drain electrodes 66a and 66b, corresponding respectively to the first and the second data lines 62a and 62b, are disposed on the first ohmic contact layer 55, the second ohmic contact layer 56, and the gate insulating layer 30.

The first and the second data lines 62a and 62b extend in a second direction, for example a vertical direction which is substantially perpendicular to the storage line 28, intersect the gate line 22 and the storage line 28, and transmit a data signal. A first and a second source electrodes 65a and 65b extend from the first and the second data lines 62a and 62b, respectively. The first and the second source electrodes 65a and 65b face the first and the second drain electrodes 66a and 66b, respectively. Referring to FIG. 1, the first data line 62a transmits a first data signal DAT1 to the first sub-pixel electrode 82a, and the second data line 62b transmits a second data signal DAT2 to the second sub-pixel electrode 82b.

The first and the second data lines 62a and 62b, the first and the second source electrodes 65a and 65b, and the first and the second drain electrodes 66a and 66b are collectively referred to as data wiring.

The data wiring (62a, 62b, 65a, 65b, 66a, and 66b) may comprise a fireproof metal, such as chromium, a molybdenum-based metal, tantalum, titanium, or the like, or a combination comprising at least one of the foregoing metals. The data wiring (62a, 62b, 65a, 65b, 66a, and 66b) may comprise a multilayer structure, including a lower layer comprising a fireproof metal, and an upper layer comprising of an electrically conductive material. For example, the data wiring (62a, 62b, 65a, 65b, 66a, and 66b) may comprise a double layer, including a lower layer comprising chromium and an upper layer comprising aluminum, or include a lower layer comprising aluminum and an upper layer comprising molybdenum. Alternatively, the data wiring (62a, 62b, 65a, 65b, 66a, and 66b) may comprise a triple layer, including an aluminum layer interposed between molybdenum layers.

The first and the second source electrodes 65a and 65b at least partially overlap the first and the second semiconductor layers 40a and 40b, respectively. The first drain electrode 66a and the first source electrode 65a are disposed at opposite sides of the first gate electrode 26a, and the second drain electrode 66b and the second source electrode 65b are disposed at opposite sides of the second gate electrode 26b. The first and the second drain electrodes 66a and 66b at least partially overlap the first and the second semiconductor layers 40a and 40b, respectively. Each of the first ohmic contact layers 55 is interposed between the first semiconductor layer 40a and the first source electrode 65a, or between the second semiconductor layer 40b and the second source electrode 65b. Each of the second ohmic contact layers 56 is interposed between the first semiconductor layer 40a and the first drain electrode 66a, or between the second semiconductor layer 40b and the second drain electrode 66b. The first ohmic contact layer 55 reduces a contact resistance between the first semiconductor layer 40a and the first source electrode 65a, and between the second semiconductor layer 40b and the second source electrode 65b. The second ohmic contact layer 56 reduces the contact resistance between the first semiconductor layer 40a and the first drain electrode 66a, and between the second semiconductor layer 40b and the second drain electrode 66b.

The first gate electrode 26a, the first source electrode 65a, and the first drain electrode 66a respectively form three terminals of a first TFT $Q_1$ and together serve as a first switching device. The second gate electrode 26b, the second source electrode 65b, and the second drain electrode 66b respectively form three terminals of a second TFT $Q_2$ and together serve as a second switching device.

A passivation layer 70 is disposed on the data wiring (62a, 62b, 65a, 65b, 66a, and 66b) and exposed portions of the first and the second semiconductor layers 40a and 40b. The passivation layer 70 may comprise an inorganic material, such as silicon nitride, silicon oxide, or the like, or an organic material, such as an organic material having excellent planarization properties and photosensitivity, or a low-k dielectric material, such as amorphous silicon oxycarbide (a-Si:C:O), amorphous silicon oxyfluoride (a-Si:O:F), or the like, or a combination comprising at least one of the foregoing low-k materials obtained by plasma enhanced chemical vapor deposition ("PECVD"). The passivation layer 70 may comprise a double-layer structure including a lower layer comprising an inorganic material, and an upper layer comprising an organic material. In this case, the passivation layer 70 may have the properties of an oxide layer and may be able to effectively protect the exposed portions of the first and the second semiconductor layers 40a and 40b. A red, green, or blue color filter layer may be used as the passivation layer 70.

A first and a second contact holes 76a and 76b are formed in the passivation layer 70. The first sub-pixel electrode 82a is physically and electrically connected to the first drain electrode 66a through the first contact hole 76a, and thus receives a data signal and a control voltage from the first drain electrode 66a. Likewise, the second sub-pixel electrode 82b is physically and electrically connected to the second drain electrode 66b through the second contact hole 76b, and thus receives a data signal and a control voltage from the second drain electrode 66b.

The first and the second sub-pixel electrodes 82a and 82b are disposed on opposite sides of a floating electrode 85. Together, the first and the second sub-pixel electrodes 82a and 82b generate an electric field and thus determine the alignment of liquid crystal molecules interposed between the first sub-pixel electrode 82a and the floating electrode 85, or between the second sub-pixel electrode 82b and the floating electrode 85. Transmittance of light from a backlight assembly (not shown) may be controlled by varying the alignment of liquid crystal molecules. In this manner, an image may be displayed on a liquid crystal panel.

The first sub-pixel electrode 82a is electrically connected to the first drain electrode 66a of the first TFT $Q_1$ through the first contact hole 76a. The first sub-pixel electrode 82a may include a plurality of branches which are substantially parallel to each other and can be disposed as stripes. The first sub-pixel electrode 82a may be substantially parallel to the first and the second data lines 62a and 62b. The first sub-pixel electrode 72a may comprise a transparent material, such as ITO, IZO, or the like, or a combination comprising at least one of the foregoing transparent materials, so as to be able to transmit light therethrough.

The second sub-pixel electrode 82b may be substantially coplanar with the first sub-pixel electrode 82a. The second sub-pixel electrode 82b is electrically connected to the second drain electrode 66b of the second TFT $Q_2$ through the second contact hole 76b. The first and the second sub-pixel electrodes 82a and 82b may be physically and electrically isolated from each other. The second data signal DAT2 is applied to the second sub-pixel electrode 82b through the second TFT $Q_2$. The second sub-pixel electrode 82b, like the first sub-pixel electrode 82a, includes a plurality of branches which are substantially parallel to each other and can be disposed as stripes. The first and the second sub-pixel electrodes 82a and 82b are substantially coplanar with each other, and are isolated from each other by the floating electrode 85, which is disposed between the first and the second sub-pixel electrodes 82a and 82b.

The floating electrode 85 is electrically isolated, and thus no signal is applied to the floating electrode 85. The floating electrode 85 is capacitance-coupled to the first and the second sub-pixel electrodes 82a and 82b. The floating electrode 85 may be substantially coplanar with the first and the second sub-pixel electrodes 82a and 82b, and may at least partially overlap the first and the second sub-pixel electrodes 82a and 82b. However, the floating electrode 85 need not be on the first or the second sub-pixel electrodes 82a and 82b, or vice versa. Rather, the floating electrode 85 may be disposed close enough to the first and the second sub-pixel electrodes 82a and 82b to be capacitance-coupled to the first and the second sub-pixel electrodes 82a and 82b. For example, the floating electrode 85 and the first and the second sub-pixel electrodes 82a and 82b may be disposed side by side.

The floating electrode 85 may be capacitance-coupled to both the first and the second sub-pixel electrodes 82a and 82b. The floating electrode 85 may be interposed between the first and the second sub-pixel electrodes 82a and 82b. Referring to FIG. 1, the floating electrode 85 may include a plurality of branches which are substantially parallel to each other and can be disposed as stripes. Some of the branches of the floating electrode 85 may overlap the first sub-pixel electrode 82a, and the other branches of the floating electrode 85 may overlap the second sub-pixel electrode 82b.

The first sub-pixel electrode 82a and the floating electrode 85 may be capacitance-coupled to each other and may thus form a first liquid crystal capacitor $C_{LC1}$. The second sub-pixel electrode 82b and the floating electrode 85 may be capacitance-coupled to each other, and may thus form a second liquid crystal capacitor $C_{LC2}$. The first and the second liquid crystal capacitors $C_{LC1}$ and $C_{LC2}$ may be disposed on opposite sides of the floating electrode 85 and may be electrically connected in series.

The first and the second sub-pixel electrodes 82*a* and 82*b* may have different areas. More specifically, an overlapping area of the first sub-pixel electrode 82*a* and the floating electrode 85 may be different from an overlapping area of the second sub-pixel electrode 82*b* and the floating electrode 85. If the first and the second liquid crystal capacitors $C_{LC1}$ and $C_{LC2}$ are electrically connected in series, the first and the second liquid crystal capacitors $C_{LC1}$ and $C_{LC2}$ may be charged with the same amount of electric charge. Voltages respectively stored in the first and the second liquid crystal capacitors $C_{LC1}$ and $C_{LC2}$ may be determined by the capacitance levels of the first and the second liquid crystal capacitors $C_{LC1}$ and $C_{LC2}$. For example, if the overlapping area of the first sub-pixel electrode 82*a* and the floating electrode 85 is greater than the overlapping area of the second sub-pixel electrode 82*b* and the floating electrode 85, a voltage between the first sub-pixel electrode 82*a* and the floating electrode 85 may be lower than a voltage between the second sub-pixel electrode 82*b* and the floating electrode 85.

When the voltage between the first sub-pixel electrode 82*a* and the floating electrode 85 is different from the voltage between the second sub-pixel electrode 82*b* and the floating electrode 85, a plurality of domains having different grayscale levels, i.e., a high-grayscale domain to which a high voltage is applied and a low-grayscale domain to which a low voltage is applied, may be generated in one pixel, and thus, the viewing angles and the visibility of the LCD 1 may be improved.

To further improve visibility and viewing angles, a low-grayscale domain of each pixel may be wider than a high-grayscale domain of a corresponding pixel. Thus, the overlapping area of the first sub-pixel electrode 82*a* and the floating electrode 85 may be greater than the overlapping area of the second sub-pixel electrode 82*b* and the floating electrode 85. In this case, a capacitance of the first liquid crystal capacitor $C_{LC1}$ may be higher than a capacitance of the second liquid crystal capacitor $C_{LC2}$.

Since the first and the second liquid crystal capacitors $C_{LC1}$ and $C_{LC2}$ have different capacitance levels, the first and the second liquid crystal capacitors $C_{LC1}$ and $C_{LC2}$ may be charged with different voltages. That is, if the overlapping area of the first sub-pixel electrode 82*a* and the floating electrode 85 is greater than the overlapping area of the second sub-pixel electrode 82*b* and the floating electrode 85, the voltage of the first liquid crystal capacitor $C_{LC1}$ may be lower than the voltage of the second liquid crystal capacitor $C_{LC2}$, and thus, the overlapping area of the first sub-pixel electrode 82*a* and the floating electrode 85 may be a low-grayscale domain. It is possible to select the voltage applied to each domain by selecting the capacitance level of the first and the second liquid crystal capacitors $C_{LC1}$ and $C_{LC2}$.

The ratio of the capacitance of the first liquid crystal capacitor $C_{LC1}$ to the capacitance of the second liquid crystal capacitor $C_{LC2}$ may be between about 3:1 to about 1:1, specifically about 2:1 to about 1.2:1, more specifically about 1.9:1 to about 1.3:1. In this case, the ratio of the voltage between the first sub-pixel electrode 82*a* and the floating electrode 85 to the voltage between the second sub-pixel electrode 82*b* and the floating electrode 85 may be between about 0.1:1 to about 2:1, specifically about 0.5:1 to about 0.83:1, more specifically about 0.6:1 to about 0.8:1.

In the embodiment show in FIGS. 1 through 3, the first and the second sub-pixel electrodes 82*a* and 82*b* and the floating electrode 85 extend in a direction parallel to the first and the second data lines 62*a* and 62*b*. However, the disclosed embodiments are not restricted to this configuration. That is, the first and the second sub-pixel electrodes 82*a* and 82*b*, and the floating electrode 85, may extend in a direction that is inclined relative to the first and the second data lines 62*a* and 62*b*.

The first and the second sub-pixel electrodes 82*a* and 82*b* and the floating electrode 85 are substantially coplanar. Thus, if the first and the second data signals DAT1 and DAT2 are applied to the first and the second sub-pixel electrodes 82*a* and 82*b*, respectively, a lateral electric field may be generated between the first sub-pixel electrode 82*a* and the floating electrode 85, and between the second sub-pixel electrode 82*b* and the floating electrode 85.

An alignment layer 90, for aligning liquid crystal molecules, is disposed on the first and the second sub-pixel electrodes 82*a* and 82*b* and the passivation layer 70.

The upper display panel 3 includes a second insulating substrate 110, which comprises a transparent material, such as glass, or the like, and a black matrix 120, which is disposed on the second insulating substrate 110, prevents the leakage of light, and defines a pixel region. In order to prevent the leakage of light near the first and the second sub-pixel electrodes 82*a* and 82*b* and the first and the second TFTs $Q_1$ and $Q_2$, the black matrix 120 may be disposed in various shapes. The black matrix 120 may comprise a metal, such as chromium, a metal oxide such as chromium oxide, an organic black resist, or the like, or a combination comprising at least one of the foregoing materials.

Red, green, and blue color filters 130 may be sequentially arranged in a pixel region defined by the black matrix 120.

An overcoat layer 140 may be disposed on the color filters 130 in order to planarize the step difference between the color filters 130.

An alignment layer 160 for aligning liquid crystal molecules may be disposed on the overcoat layer 140.

The lower display panel 2 and the upper display panel 3 may be aligned and may then be coupled. Thereafter, liquid crystal molecules may be injected into the space between the lower display panel 2 and the upper display panel 3. Thereafter, the liquid crystal molecules may be vertically aligned, thereby completing the manufacture of the LCD 1.

Liquid crystal molecules in the liquid crystal layer 4 have a director, and the liquid crystal molecules may be aligned so that the directors of the liquid crystal molecules can be perpendicular to the lower display panel 2 and the upper display panel 3 when no electric field is applied to the first sub-pixel electrode 82*a*, the second sub-pixel electrode 82*b*, and the floating electrode 85. The liquid crystal molecules in the liquid crystal layer 4 may have negative dielectric anisotropy.

The LCD 1 may also include various elements, other than those set forth herein. For example, the LCD 1 may also include a polarization plate and a backlight assembly.

The operation of the LCD 1 will hereinafter be described in detail with reference to FIGS. 1, 3 and 4.

The first data signal DAT1 is applied to the first sub-pixel electrode 82*a* through the first data line 62*a*, and the second data signal DAT2 is applied to the second sub-pixel electrode 82*b* through the second data line 62*b*.

The first and the second data signals DAT1 and DAT2 may be controlled by the first and the second TFTs $Q_1$ and $Q_2$. The first and the second TFTs $Q_1$ and $Q_2$ may both be electrically connected to the gate line 22, and may thus be controlled at the same time.

When the first and the second data signals DAT1 and DAT2 are applied to the first and the second sub-pixel electrodes 82*a* and 82*b*, respectively, the first and the second liquid crystal capacitors $C_{LC1}$ and $C_{LC2}$ are charged. As a result, an electric field is generated between the first sub-pixel electrode 82a and the floating electrode 85, and between the second sub-pixel electrode 82b and the floating electrode 85.

Since the first and the second liquid crystal capacitors $C_{LC1}$ and $C_{LC2}$ have different capacitance levels, a voltage of the first liquid crystal capacitor $C_{LC1}$ may be different from a voltage of the second liquid crystal capacitor $C_{LC2}$.

The first and the second sub-pixel electrodes 82a and 82b partially overlap the storage line 28, and may thus form a first and a second storage capacitors $Cst_1$ and $Cst_2$, respectively.

The first and the second data signals DAT1 and DAT2 may be generated as voltages having opposite phases. Referring to FIG. 4, the first and the second data signals DAT1 and DAT2 swing at regular intervals of time. One of the first and the second data signals DAT1 and DAT2 may be obtained by inverting the other data signal. Thus, a difference between the voltages of the first and the second data signals DAT1 and DAT2 may be uniform. Therefore, it is possible to prevent the deterioration of picture quality. In the exemplary embodiment shown in FIGS. 1 through 4, the difference between the voltages of the first and the second data signals DAT1 and DAT2 is used. Thus, there is no need for a data driver (not shown) to generate a high voltage.

Figure 5:
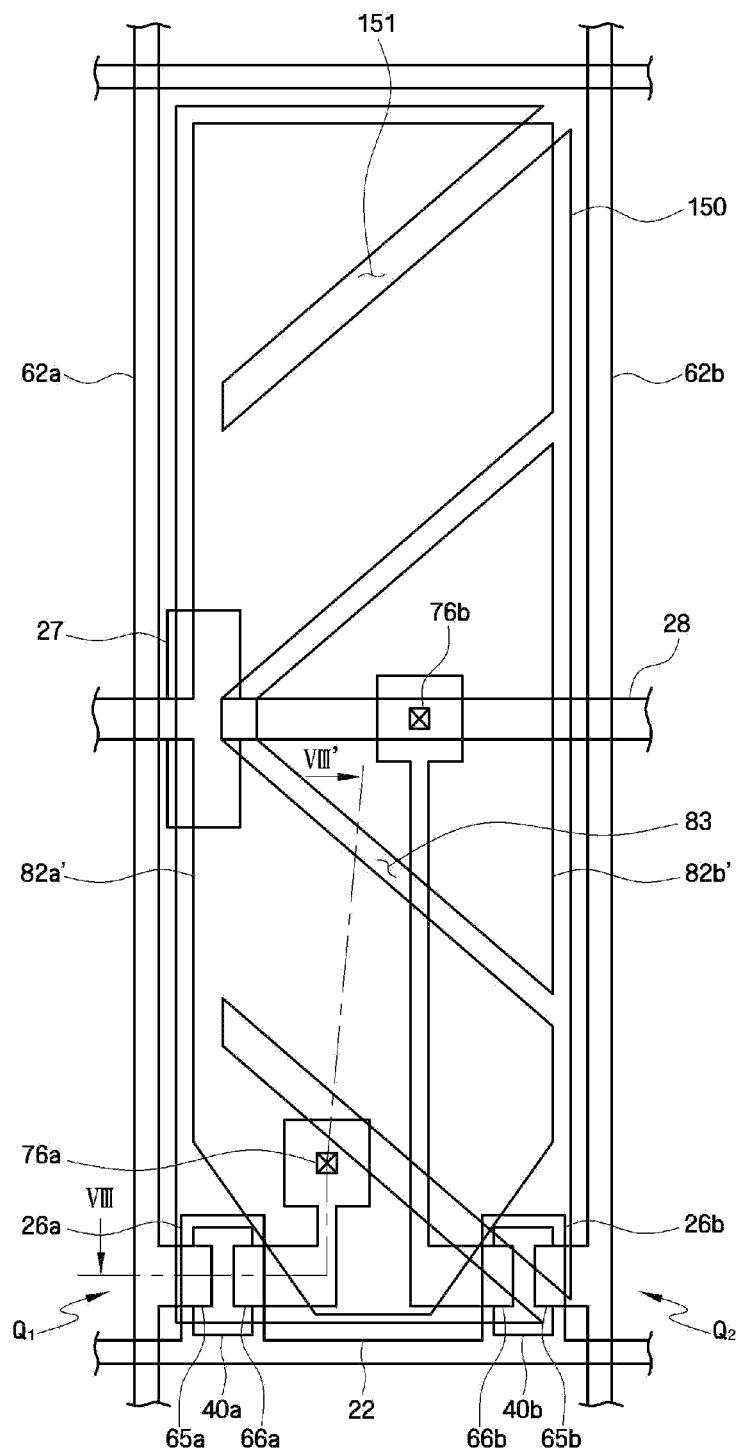
FIG. 5 is a plan view showing another exemplary embodiment of an LCD.
Figure 6:
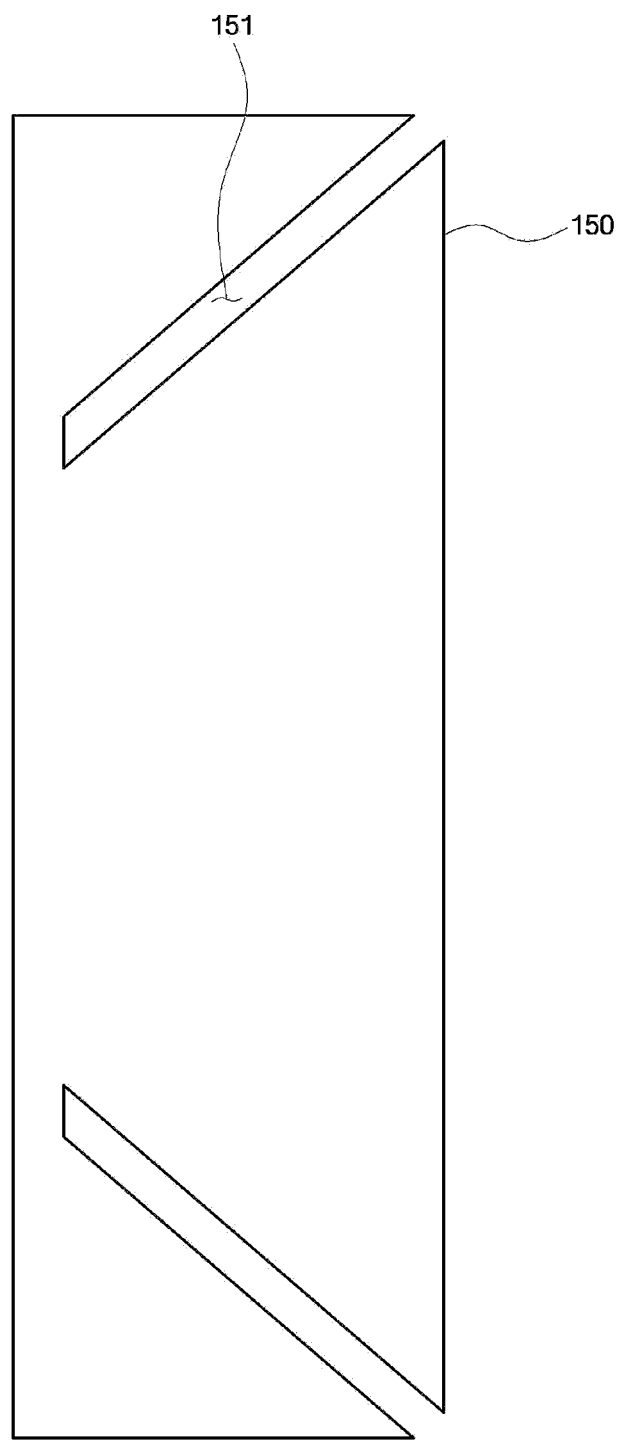
FIG. 6 is a plan view showing an exemplary embodiment of an upper display panel included in the LCD shown in FIG. 5.
Figure 7:
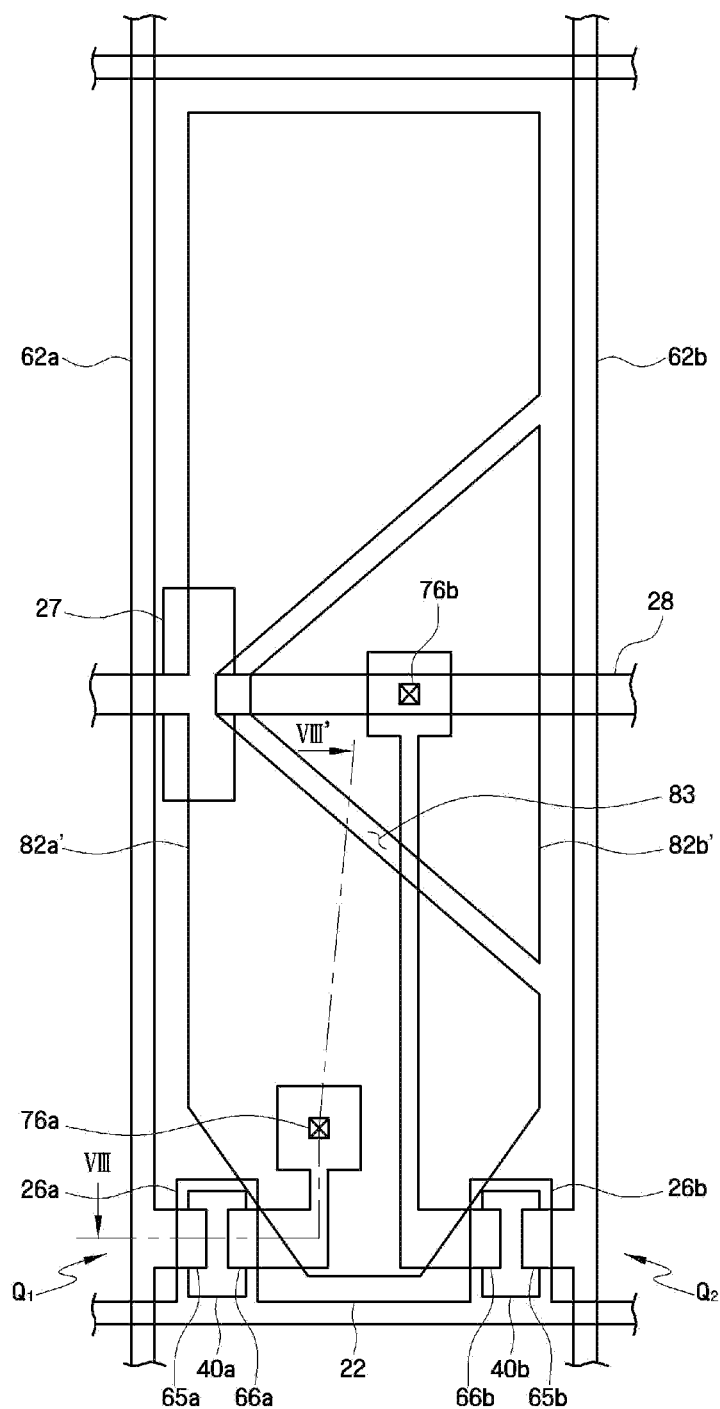
FIG. 7 is plan view showing an exemplary embodiment of a lower display panel included in the LCD shown in FIG. 5.
Figure 8:
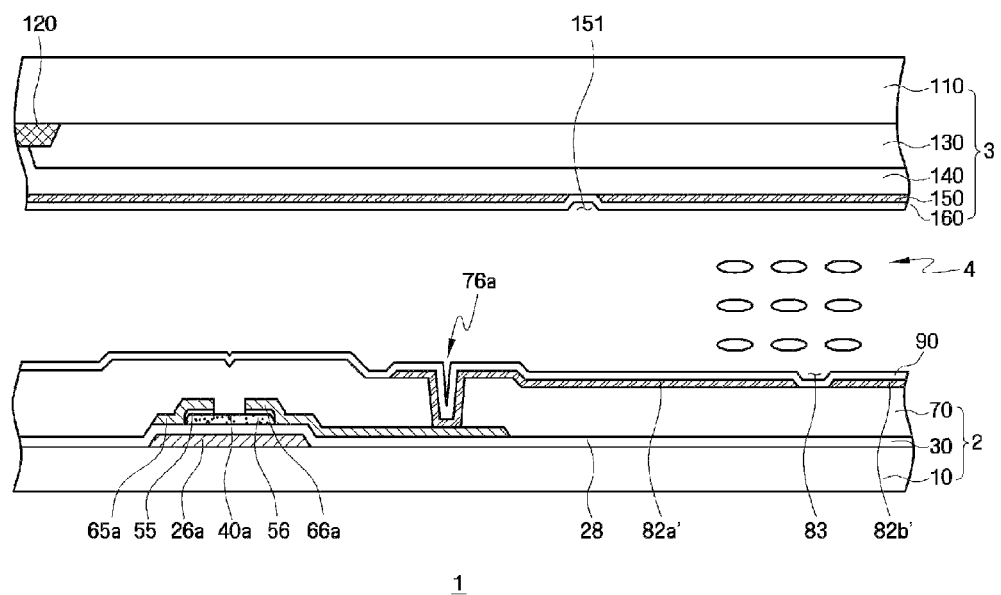
FIG. 8 is a cross-sectional view taken along line VIII-VIII' of FIG. 5 showing an exemplary embodiment of an upper display panel.

An LCD according to another exemplary embodiment will hereinafter be described in detail with reference to FIGS. 5 through 8. FIG. 5 is a plan view showing an exemplary embodiment of an LCD 1 according to another exemplary embodiment, FIG. 6 is a plan view showing an exemplary embodiment of an upper display panel 3 included in the LCD, FIG. 7 is a plan view showing an exemplary embodiment of a lower display panel 2 included in the LCD, and FIG. 8 is a cross-sectional view taken along line VIII-VIII' of FIG. 5. In FIGS. 1 through 8, like reference numerals indicate like elements, and thus, detailed descriptions thereof will be omitted.

The LCD may include a lower display panel 2, on which a first and a second sub-pixel electrodes 82a' and 82b' are disposed, and an upper display panel 3, on which a second floating electrode 150 is disposed.

The first and the second sub-pixel electrodes 82a' and 82b' may be disposed on a first insulating substrate 10 and may comprise a transparent material, such as ITO, IZO, or the like, or a combination comprising at least one of the foregoing transparent materials. The second floating electrode 150 may be disposed on the second insulating substrate 110 and may overlap the first and the second sub-pixel electrodes 82a' and 82b'.

The first sub-pixel electrode 82a' may be isolated from the second sub-pixel electrode 82b' and may surround the second sub-pixel electrode 82b'. A first domain divider 83 may be disposed between the first and the second sub-pixel electrodes 82a' and 82b'. The first domain divider 83 may form an angle with the gate line 22. In an embodiment, the first domain divider may form an angle of about +45° or about −45° with a gate line 22. In an embodiment, the first domain divider 83 may form an angle of about +45° or about −45° with an edge of the floating electrode. Each of the first and the second sub-pixel electrodes 82a' and 82b' may define an area obtained by dividing a pixel. The first sub-pixel electrode 82' may form a first liquid crystal capacitor $C_{LC1}$ with the second floating electrode 150, and the second sub-pixel electrode 82b' may form a second liquid crystal capacitor $C_{LC2}$ with the second floating electrode 150.

The second floating electrode 150 is electrically isolated. That is, the second floating electrode 150 may be disposed in each pixel, and may include a second domain divider 151, which divides a pixel into a plurality of domains. The second domain divider 151 may overlap at least one of the first and the second sub-pixel electrodes 82a' and 82b'. The second domain divider 151, like the first domain divider 83, may form an angle with the gate line 22. In an embodiment, the second domain divider may form an angle of about +45° or about −45° with the gate line 22. In an embodiment, the second domain divider may form an angle of about +45° or about −45° with the an edge of the floating electrode. The first domain divider 83 and the second domain divider 151 may be disposed as a slit or protrusion.

The second floating electrode 150, which overlaps both the first and the second sub-pixel electrodes 82a' and 82b', forms the first liquid crystal capacitor $C_{LC1}$ along with the first sub-pixel electrode 82a', and forms the second liquid crystal capacitor $C_{LC2}$ along with the second sub-pixel electrode 82b'. The first and the second liquid crystal capacitors $C_{LC1}$ and $C_{LC2}$ are electrically connected in series. Therefore, when first and the second data signals DAT1 and DAT2 are applied to the first and the second sub-pixel electrodes 82a' and 82b', respectively, different voltages are applied between the first sub-pixel electrode 82a' and the second floating electrode 150, and between the second sub-pixel electrode 82b' and the second floating electrode 150.

The difference between a voltage between the first sub-pixel electrode 82a' and the second floating electrode 150 and a voltage between the second sub-pixel electrode 82b' and the floating electrode may result from the difference between the capacitance of the first liquid crystal capacitor $C_{LC1}$ and the capacitance of the second liquid crystal capacitor $C_{LC2}$. The capacitance of the first liquid crystal capacitor $C_{LC1}$ may vary according to the overlapping area of the first sub-pixel electrode 82a' and the second floating electrode 150. Likewise, the capacitance of the second liquid crystal capacitor $C_{LC2}$ may vary according to the overlapping area of the second sub-pixel electrode 82b' and the second floating electrode 150.

A liquid crystal layer 4, which is vertically aligned, may be interposed between the upper display panel 3 and the lower display panel 2. When the first and the second data signals DAT1 and DAT2 are applied to the first and the second sub-pixel electrodes 82a' and 82b', respectively, liquid crystal molecules in the liquid crystal layer 4 may tilt toward the direction of formation of the respective domains.

Figure 9:
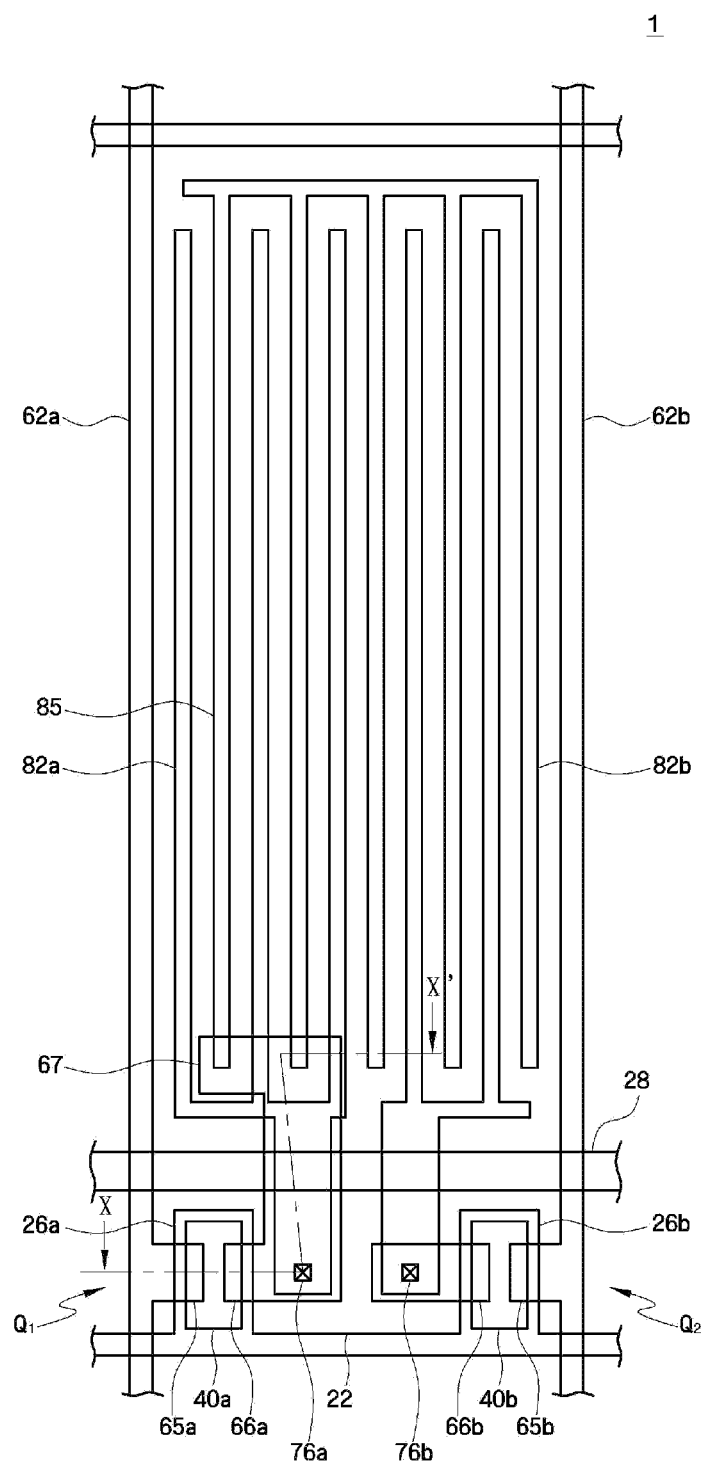
FIG. 9 is a plan view showing another exemplary embodiment of an LCD.
Figure 10:
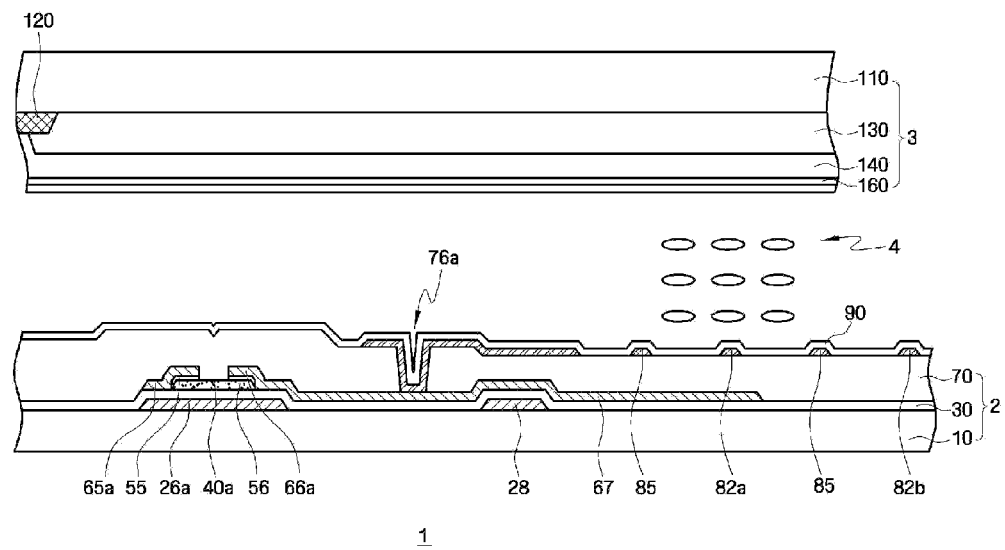
FIG. 10 is a cross-sectional view taken along line X-X' of FIG. 9 showing an exemplary embodiment of an LCD.
Figure 11:
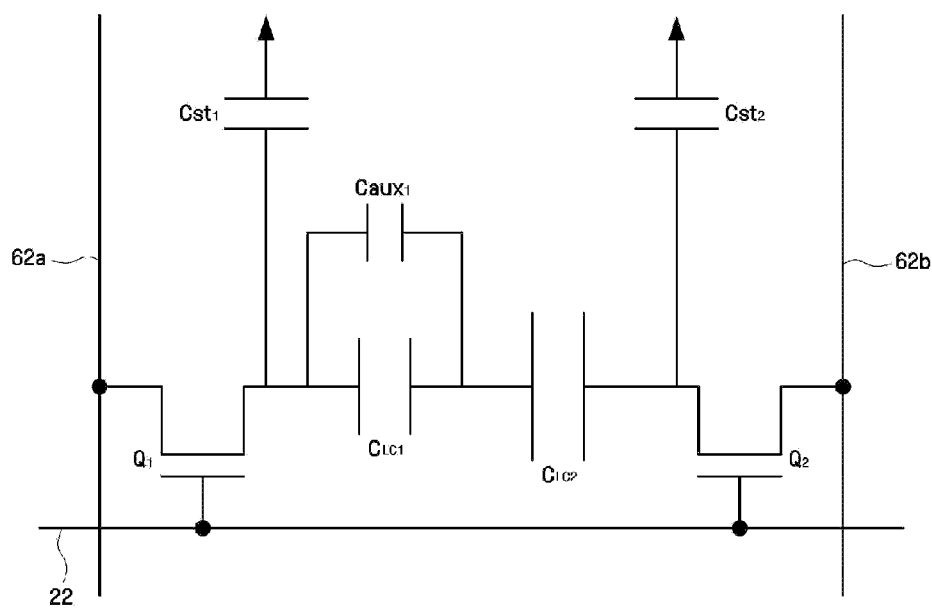
FIG. 11 is an equivalent circuit diagram of an exemplary embodiment of a pixel of the LCD shown in FIG. 9.

An LCD according to another exemplary embodiment will hereinafter be described in detail with reference to FIGS. 9 through 11. FIG. 9 illustrates a plan view showing an exemplary embodiment of an LCD 1 according to another exemplary embodiment, FIG. 10 is a cross-sectional view taken along line X-X' of FIG. 9, and FIG. 11 is an equivalent circuit diagram of an exemplary embodiment of a pixel of the LCD. In FIGS. 1 through 4 and 9 through 11, like reference numerals indicate like elements, and thus, detailed descriptions thereof will be omitted.

Referring to FIG. 11, an auxiliary capacitor $Caux_1$ is formed between a first sub-pixel electrode 82a and a floating electrode 85.

Referring to FIGS. 9 through 11, the first sub-pixel electrode 82a is electrically connected to a first drain electrode 66a through a first contact hole 76a. The first drain electrode 66a has an extended portion. The extended portion of the first drain electrode 66a forms an auxiliary electrode 67. The auxiliary electrode 67 forms an auxiliary capacitor $Caux_1$ by partially overlapping the floating electrode 85.

Since the auxiliary electrode 67 is electrically connected to the first sub-pixel electrode 82a through the first drain electrode 66a, the auxiliary capacitor $Caux_1$ and a first liquid crystal capacitor $C_{LC1}$ are substantially electrically connected in parallel.

The auxiliary capacitor $Caux_1$ may be used to select the capacitance of the first liquid crystal capacitor $C_{LC1}$ and the capacitance of a second liquid crystal capacitor $C_{LC2}$. Therefore, it is possible to select the ratio of a plurality of voltages respectively applied to a plurality of domains by selecting the capacitance levels of the auxiliary capacitor $Caux_1$, the first liquid crystal capacitor $C_{LC1}$, and the second liquid crystal capacitor $C_{LC2}$.

Figure 12:
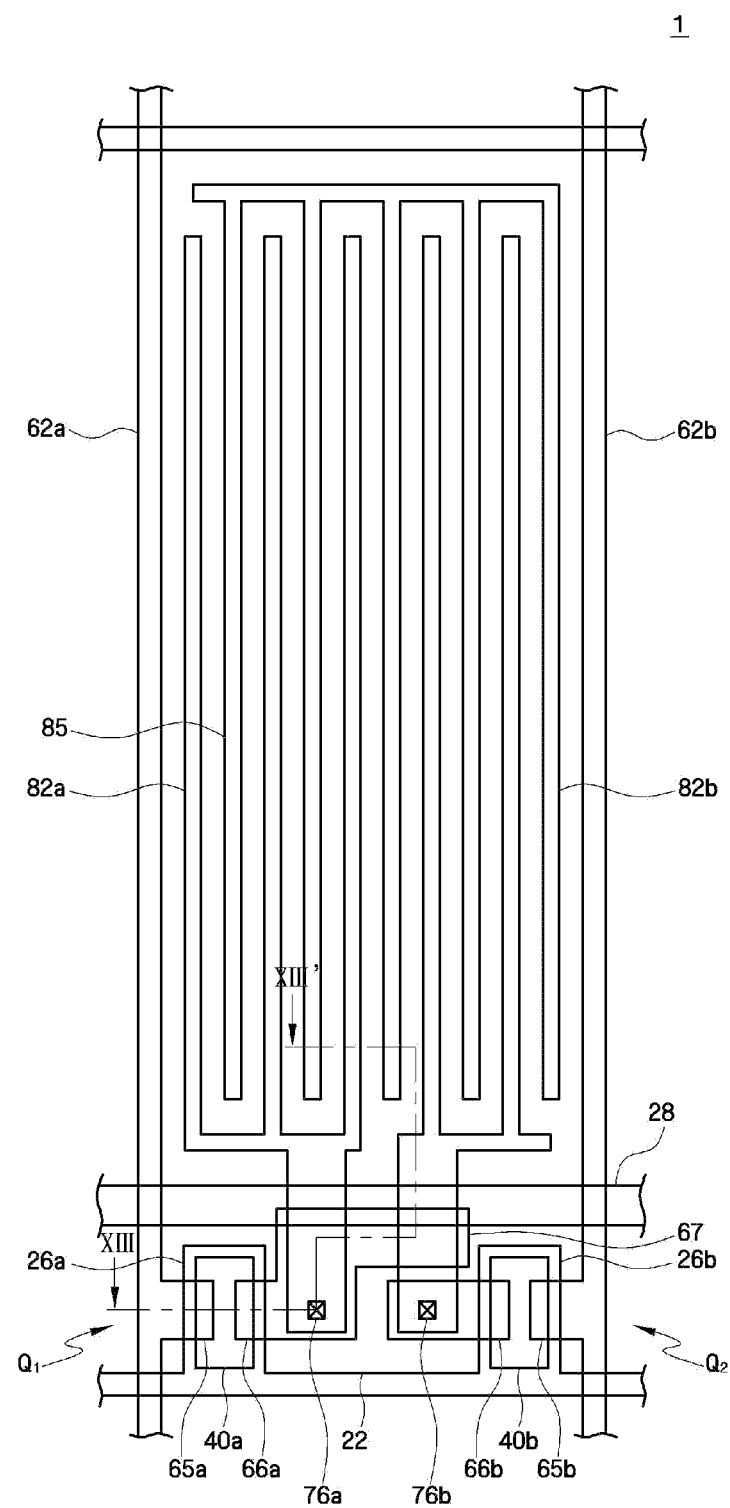
FIG. 12 is a plan view showing another exemplary embodiment of an LCD.
Figure 13:
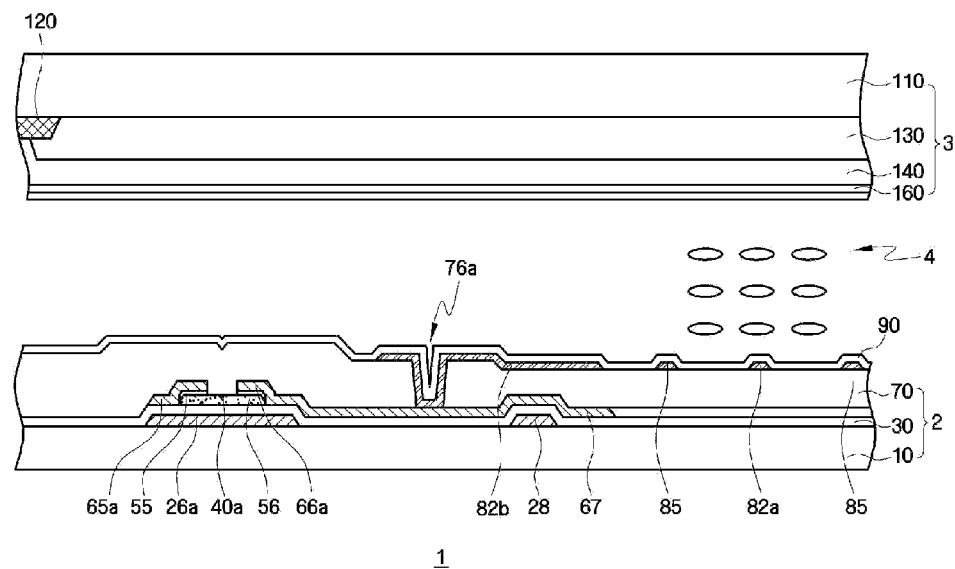
FIG. 13 is a cross-sectional view taken along line XIII-XIII' of FIG. 12 showing an exemplary embodiment of an LCD.
Figure 14:
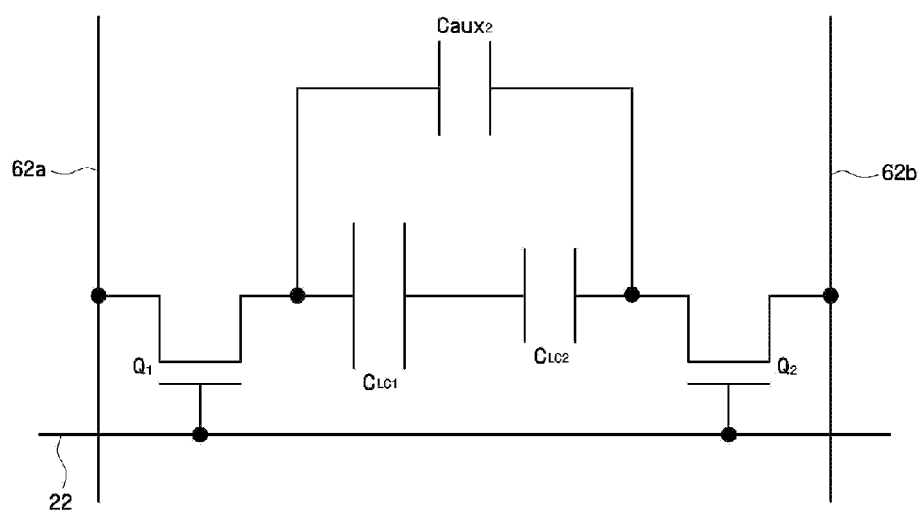
FIG. 14 is an equivalent circuit diagram of an exemplary embodiment of a pixel of the LCD shown in FIG. 12.

An LCD according to another exemplary embodiment will hereinafter be described in detail with reference to FIGS. 12 through 14. FIG. 12 is a plan view showing an exemplary embodiment of an LCD 1 according to another exemplary embodiment, FIG. 13 is a cross-sectional view taken along line XIII-XIII' of FIG. 12, and FIG. 14 is an equivalent circuit diagram of an exemplary embodiment of a pixel of the LCD. In FIGS. 1 through 4 and 12 through 14, like reference numerals indicate like elements, and thus, detailed descriptions thereof will be omitted.

Referring to FIG. 14, an auxiliary capacitor $Caux_2$ is formed between a first sub-pixel electrode 82a and a second sub-pixel electrode 82b.

Referring to FIGS. 12 through 14, the first sub-pixel electrode 82a is electrically connected to a first drain electrode 66a through a first contact hole 76a. The first drain electrode 66a has an extended portion. The extended portion of the first drain electrode 66a forms an auxiliary electrode 67. The auxiliary electrode 67 forms an auxiliary capacitor $Caux_2$ by partially overlapping the second sub-pixel electrode 82b.

Since the auxiliary electrode 67 is electrically connected to the first sub-pixel electrode 82a through the first drain electrode 66a, both electrodes of the auxiliary capacitor $Caux_2$ are electrically connected to the first and the second sub-pixel electrodes 82a and 82b.

Since the first and the second liquid crystal capacitors $C_{LC1}$ and $C_{LC2}$ are electrically connected in series, the auxiliary capacitor $Caux_2$ is electrically connected in parallel to the first and the second liquid crystal capacitors $C_{LC1}$ and $C_{LC2}$.

The auxiliary capacitor $Caux_2$ may be used to select the capacitance of the first liquid crystal capacitor $C_{LC1}$ and the capacitance of the second liquid crystal capacitor $C_{LC2}$. Therefore, it is possible to select the ratio of a plurality of voltages respectively applied to a plurality of domains by selecting the capacitance levels of the auxiliary capacitor $Caux_2$, the first liquid crystal capacitor $C_{LC1}$, and the second liquid crystal capacitor $C_{LC2}$.

Figure 15:
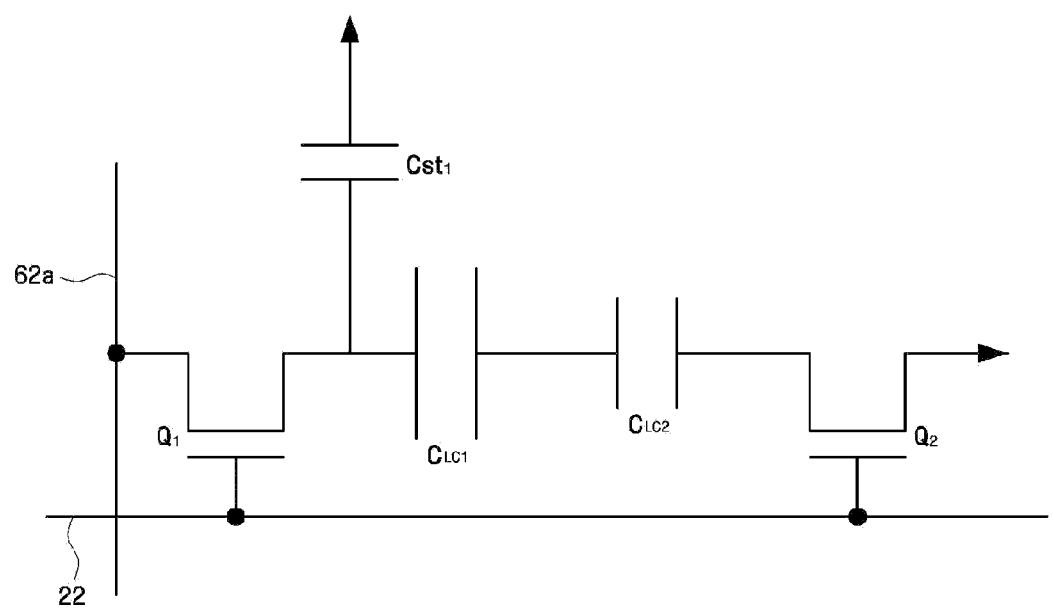
FIG. 15 is an equivalent circuit diagram of another exemplary embodiment of a pixel of an LCD.

An LCD according another exemplary embodiment will hereinafter be described in detail with reference to FIG. 15. FIG. 15 is an equivalent circuit diagram of an exemplary embodiment of a pixel of an LCD according to another exemplary embodiment. In FIGS. 1 through 4 and 15, like reference numerals indicate like elements, and thus, detailed descriptions thereof will be omitted.

Referring to FIG. 15, a first and a second liquid crystal capacitors $C_{LC1}$ and $C_{LC2}$ are electrically connected in series. A first data signal DAT1 is applied to a first terminal of the first and the second liquid crystal capacitors $C_{LC1}$ and $C_{LC2}$, and a common voltage is applied to a second terminal of the first and the second liquid crystal capacitors $C_{LC1}$ and $C_{LC2}$. The first data signal DAT1 and the common voltage are controlled by a first and a second TFTs $Q_1$ and $Q_2$.

The common voltage may be a signal having a uniform potential. Alternatively, the common voltage may be a pulse signal that swings so as to provide a uniform potential difference. Thus the second data signal can be a pulse-type common voltage.

Figure 16:
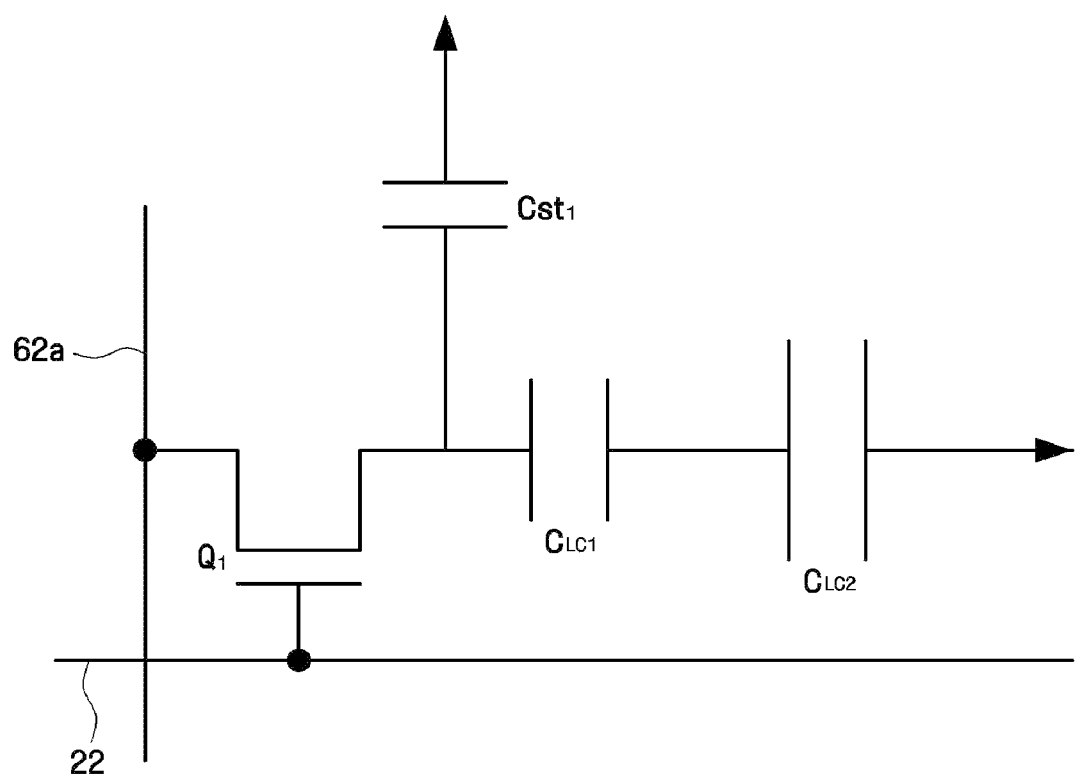
FIG. 16 is an equivalent circuit diagram of another exemplary embodiment of a pixel of an LCD.

FIG. 16 is an equivalent circuit diagram of an exemplary embodiment of a pixel of an LCD according to another exemplary embodiment. Referring to FIG. 16, a first and a second liquid crystal capacitors $C_{LC1}$ and $C_{LC2}$ are electrically connected in series. A first data signal DAT1 is applied to a first terminal of the first and the second liquid crystal capacitors $C_{LC1}$ and $C_{LC2}$, and a common voltage is applied to a second terminal of the first and the second liquid crystal capacitors $C_{LC1}$ and $C_{LC2}$. The first data signal DAT1 is controlled by a first TFT $Q_1$, and the common voltage can be controlled without an additional switching device. That is, a signal having a uniform potential or a pulse signal that swings, so as to provide a uniform potential difference, may be continuously applied under no control as the common voltage.

While the embodiments have been particularly shown and described with reference to exemplary embodiments thereof, it will be understood by those of ordinary skill in the art that various changes in form and details may be made therein without departing from the spirit and scope of this disclosure, including that defined by the following claims. In addition, many modifications can be made to adapt a particular situation or material to the teachings of this disclosure without departing from the essential scope thereof. Therefore, it is intended that this disclosure not be limited to the particular embodiment disclosed as the best mode contemplated for carrying out this disclosure.

What is claimed is:

1. A liquid crystal display comprising:
   a first sub-pixel electrode which receives a first data signal from a first data line connected to the first sub-pixel electrode;
   a second sub-pixel electrode which is spaced apart from the first pixel electrode and which receives a second data signal from a second data line connected to the second sub-pixel electrode; and
   a floating electrode which is capacitance-coupled to the first sub-pixel electrode and the second sub-pixel electrode,
   wherein the first sub-pixel electrode, the second sub-pixel electrode, and the floating electrode are substantially coplanar.

2. The liquid crystal display of claim 1, wherein
   the first sub-pixel electrode and the floating electrode form a first liquid crystal capacitor,
   the second sub-pixel electrode and the floating electrode form a second liquid crystal capacitor, and
   the first liquid crystal capacitor and the second liquid crystal capacitor are electrically connected in series.

3. The liquid crystal display of claim 2, wherein a capacitance of the first liquid crystal capacitor is higher than a capacitance of the second liquid crystal capacitor.

4. The liquid crystal display of claim 3, wherein a ratio of the capacitance of the first liquid crystal capacitor to the capacitance of the second liquid crystal capacitor is between about 2:1 to about 1.2:1.

5. The liquid crystal display of claim 1, further comprising:
   a first switching device which controls the first sub-pixel electrode;
   a second switching device which controls the second sub-pixel electrode; and
   a gate signal, wherein the first switching device and the second switching device are controlled by the same gate signal.

6. The liquid crystal display of claim 1, wherein an overlapping area of the first sub-pixel electrode and the floating electrode is greater than an overlapping area of the second sub-pixel electrode and the floating electrode.

7. The liquid crystal display of claim 1, wherein a ratio of a voltage charged between the first sub-pixel electrode and the floating electrode to a voltage charged between the second sub-pixel electrode and the floating electrode is about 0.5:1 to about 0.83:1.

8. The liquid crystal display of claim 1, further comprising a first insulating substrate, wherein
- the first sub-pixel electrode is disposed on the first insulating substrate and includes a plurality of branches which are substantially parallel to each other,
- the second sub-pixel electrode is disposed on the first insulating substrate and includes a plurality of branches which are spaced apart from the first sub-pixel electrode and are substantially parallel to each other, and
- the floating electrode is disposed on the first insulating substrate and includes a plurality of branches which are spaced apart from the first and the second sub-pixel electrodes and are substantially parallel to each other.

9. The liquid crystal display of claim 8, further comprising:
- a second insulating substrate, the second insulating substrate facing the first insulating substrate; and
- a liquid crystal layer which is interposed between the first insulating substrate and the second insulating substrate and is horizontally aligned with at least one of the first insulating substrate and the second insulating substrate.

10. The liquid crystal display of claim 8, wherein an entire portion of the plurality of branches of the floating electrode are parallel to each other and the plurality of branches of the floating electrode are connected to each other.

11. The liquid crystal display of claim 1, wherein the first data signal and the second data signal have opposite phases.

12. The liquid crystal display of claim 1, further comprising a first auxiliary capacitor which is capacitance-coupled between the first sub-pixel electrode and the floating electrode.

13. The liquid crystal display of claim 1, further comprising a second auxiliary capacitor which is capacitance-coupled between the first sub-pixel electrode and the second sub-pixel electrode.

14. The liquid crystal display of claim 1, wherein the second data signal is a pulse-type common voltage.

15. The liquid crystal display of claim 14, further comprising:
- a first switching device which controls the first sub-pixel electrode; and
- a second switching device which controls the second sub-pixel electrode.

16. The liquid crystal display of claim 1, further comprising a storage line extending substantially parallel to the gate line, the storage line and floating electrode are non-overlapping.

* * * * *